United States Patent [19]

Arena

[11] Patent Number: 5,251,986
[45] Date of Patent: Oct. 12, 1993

[54] BUSHING ASSEMBLY

[75] Inventor: Aldo Arena, Smithtown, N.Y.

[73] Assignee: Grumman Aerospace Corporation, Bethpage, N.Y.

[21] Appl. No.: 926,311

[22] Filed: Aug. 10, 1992

[51] Int. Cl.$^5$ ............................................. F16C 33/04
[52] U.S. Cl. .................................... 384/272; 384/208
[58] Field of Search ............... 384/272, 271, 208, 206, 384/145, 146, 213

[56] References Cited

U.S. PATENT DOCUMENTS

| | | | |
|---|---|---|---|
| 2,244,734 | 6/1941 | Severance | 384/272 |
| 3,106,432 | 10/1963 | Opferkuch | 384/271 |
| 4,243,192 | 1/1981 | Johnson | 384/208 |
| 4,634,299 | 1/1987 | Svensson | 384/271 |

Primary Examiner—Lenard A. Footland
Attorney, Agent, or Firm—Bacon & Thomas

[57] ABSTRACT

A bushing assembly for use in eliminating axial and radial play in a connection joint is disclosed wherein the bushing assembly is comprised of various members which can be interconnected so that it can be assembled as a unit. Although various embodiments of the invention are disclosed, the bushing assembly of the present invention generally comprises first and second concentrically mounted sleeve members which are engaged along oppositely tapered surfaces such that the sleeve members, when axially tightened, are radially expanded. Both of the sleeve members are axially split so as to create a hoop stress which aids in eliminating the axial and radial play and which can increase the fatigue life of the connection joint.

13 Claims, 5 Drawing Sheets

BUSHING ASSEMBLY

BACKGROUND OF THE INVENTION

1. Field of the Invention

The present invention pertains to bushing assemblies and, more particularly, to shoulder bushing assemblies for use in connecting joints of actuation systems, such as those found in aircraft flight control systems, which function to remove axial and radial play in the joint.

2. Discussion of the Prior Art

Bushing assemblies for use in minimizing axial and radial play in connecting joints are known in the art. In general, such bushing assemblies are utilized in mounting a shaft within a bore formed in a fixed structural member. Such bushing assemblies are located within the bore between the shaft and the fixed support member. Such known bushing assemblies are intended to be wedged between the shaft and the fixed support structure, within the bore, and tightened therein such that the wedge will function to prevent radial movement of the shaft. In addition, an axial end of the bushing engages a shoulder integrally formed with or attached to the shaft to prevent axial shifting.

In one known arrangement, the shaft comprises a bolt having a tapered section which cooperates with the wedge-shaped bushing. An example of this type of prior art arrangement is disclosed in U.S. Pat. No. 4,634,299. In this patent, a bolt or axle is radially and axially fixed within aligned bores in two spaced, fixed support members. In a first embodiment disclosed in this patent, the bolt is formed with axially spaced, oppositely tapering sections which cooperate with wedge-shaped bushing elements in order to axially and radially fix the bolt between the support members. An inner race of a bearing is supported by the bolt. In addition, the axle or bolt is formed with shoulders between its tapered sections, at least one of which engages a portion of one of the fixed support members to prevent axial shifting of the inner race.

Manufacturing bolts in accordance with the disclosure in the '299 patent is expensive due to the need for the various tapered sections and shoulder sections. The '299 patent further discusses an embodiment wherein a more readily available constant diameter bolt is utilized. In that arrangement, the bores of the fixed support members are tapered in order to cooperate with the wedge-shaped bushing members. This arrangement does not solve the problem associated with the known prior art arrangement discussed above since forming the support members with tapered bores also substantially adds to the manufacturing cost.

Therefore, there exists a need in the art for a bushing assembly for use in connecting joints which does not require either the fixed support members or the shaft to be tapered. In addition, in situations where it is desired to prevent axial shifting of a connecting joint having a bearing race, there exists a need in the art for a bushing assembly which incorporates an integral shoulder so as to minimize the number of parts.

SUMMARY OF THE INVENTION

It is the object of the present invention to provide a bushing assembly that can be utilized to remove axial and radial play in connecting joints. It is a further object of the present invention to provide a bushing assembly which can be utilized in connecting joints having constant diameter shafts located within uniform diameter bores of fixed structural elements. It is a further object of the present invention to provide a bushing assembly which incorporates an integrally formed shoulder and which can be inserted between the bearing shaft and the bore of the fixed structural element as a unitary piece for ease of assembly.

These and other objects of the present invention are achieved by the present invention by providing a bushing assembly comprising a first sleeve member having a cylindrically shaped outer contour and a conically shaped inner contour and a second sleeve member having a conically shaped outer contour that geometrically conforms to the inner contour of the first sleeve member and a cylindrically shaped inner contour. The second sleeve member is adapted to be concentrically fit within the first sleeve member with the inner contour of the first sleeve member engaging the outer contour of the second sleeve member. In addition, at least the first sleeve member is formed with an outwardly projecting annular shoulder at one axial end thereof. A ring member is also provided which engages an axial end of the second sleeve member and extends about the annular shoulder of the first sleeve member to maintain the second sleeve member within the first sleeve member and to enable the bushing assembly to be placed between the shaft and the bore of the fixed support structure as a unitary piece.

According to additional embodiments of the invention, an axial end of the second sleeve member can also be formed with an outwardly projecting annular shoulder about which the ring member also extends. In another embodiment, the annular shoulder formed on the axial end of the second sleeve member can project outwardly beyond the annular shoulder of the first sleeve member and can be bent thereabout such that a separate ring member is not required. In still another embodiment, both the first and second sleeve member are formed with outwardly projecting annular shoulders and a separate machined or forged ring is brazed or welded to the annular shoulder of the first sleeve member and extends about the annular shoulder of the second sleeve member.

Other features and advantages of the present invention will become more readily apparent from the following description of preferred embodiments thereof when taken in conjunction with the drawings wherein like reference numerals refer to corresponding parts in the various embodiments disclosed.

DETAILED DESCRIPTION OF THE PREFERRED EMBODIMENTS

Figure 1:
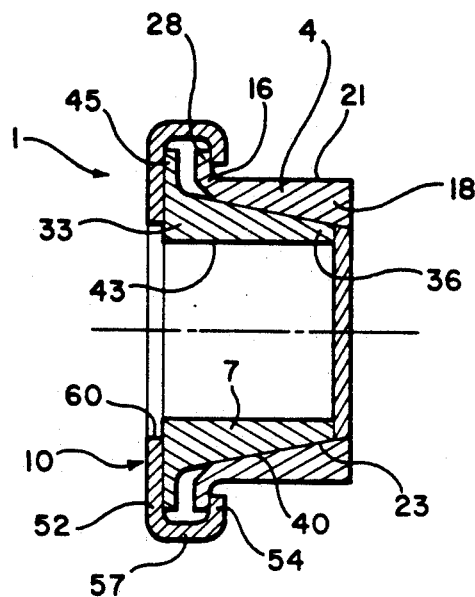
FIG. 1 shows a cross-sectional plane view of a shoulder bushing assembly according to a first embodiment of the invention.
Figure 2:
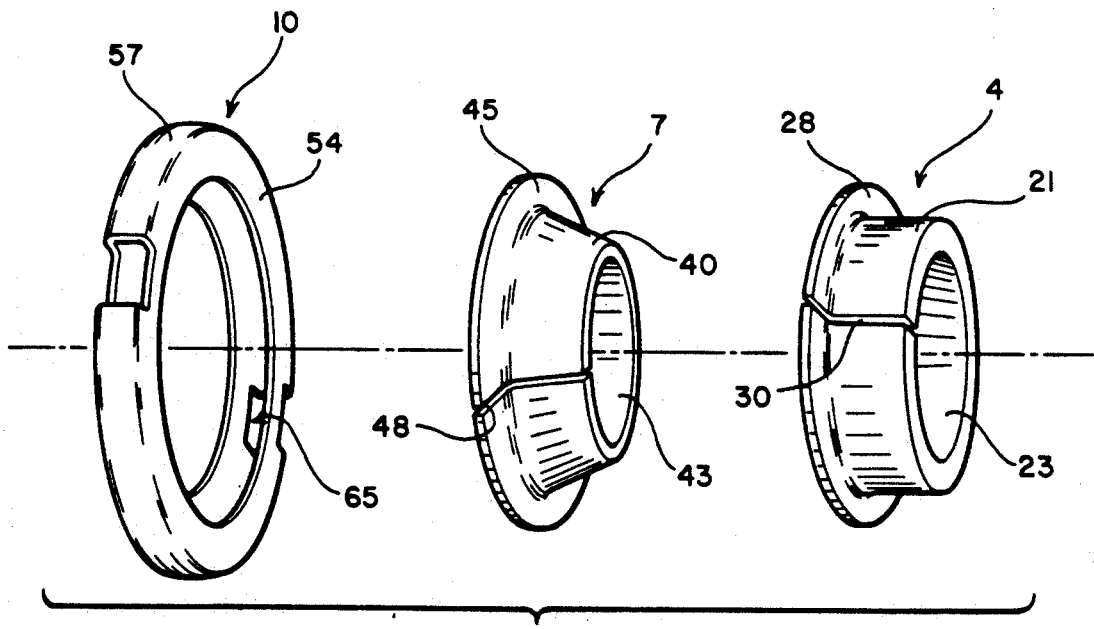
FIG. 2 shows an exploded view of the various components forming the bushing assembly of FIG. 1.

Initial reference will be made to FIGS. 1 and 2 in describing a first embodiment of the invention wherein the bushing assembly is generally indicated at 1. Bushing assembly 1 comprises a first sleeve member 4, a second sleeve member 7 and a ring member 10. First sleeve member 4 includes a first end portion 16 and a second end portion 18. Between first end portion 16 and second end portion 18, first sleeve member 4 has an outer surface 21 having a cylindrically shaped contour and an inner surface 23 which is conically shaped such that the inner contour of first sleeve member 4 tapers from second end portion 18 toward end portion 16. First end portion 16 is integrally formed with an outwardly projecting, annular flange 28 as clearly shown in both FIGS. 1 and 2. As best shown in FIG. 2, first sleeve member 4 is split axially at 30.

In a manner analogous to first sleeve member 4, second sleeve member 7 includes a first end portion 33 and an axially spaced second end portion 36. Second sleeve member 7 includes a conically shaped outer surface 40 that tapers from first end portion 33 towards second end portion 36 and an inner surface 43 that defines a central, cylindrical bore therethrough. First end portion 33 of second sleeve member 7 is also formed with an outwardly or radially projecting, annular shoulder 45 which, in the preferred embodiment, has a radial diameter equal to the radial diameter of annular shoulder 28 of first sleeve member 4 as clearly shown in FIG. 1.

The contour of outer surface 40 of second sleeve member 7 geometrically conforms to the contour of inner surface 23 of first sleeve member 4 such that second sleeve member 7 can be concentrically fit within first sleeve member 4. In an unloaded state as shown in FIG. 1, second sleeve member 7 will be concentrically fit within first sleeve member 4 with an axial space between annular shoulder 28 and annular shoulder 45. Second sleeve member 7 is also axially split at 48 (see FIG. 2) in a manner directly analogous to first sleeve member 4.

Ring member 10 is generally U-shaped in cross-section having first and second, radially extending sidewalls 52, 54 interconnected by a bridging wall 57. First sidewall 52 is longer than second sidewall 54 and includes an axially extending aperture 60 therethrough. As clearly shown in FIG. 1, aperture 60 is sized larger than the central bore defined in second sleeve member 7. In the unloaded state of bushing assembly 1 as shown in FIG. 1, bridging wall 57 extends radially about annular shoulders 28 and 45 of first and second sleeve members 4 and 7 respectively and second sidewall 54 of ring member 10 extends radially inward towards first sleeve member 4 and engages a portion of annular shoulder 28. As also shown in FIG. 1, bridging wall 57 extends about annular shoulders 28 and 45 with a predetermined amount of radial play for the reason which will be more fully discussed below. As best shown in FIG. 2, ring member 10 further includes at least one opening, generally indicated at 65, into which a tool or other object can be inserted to facilitate removal of ring member 10 from first and second sleeve members 4, 7 as will be more fully discussed below.

In the preferred embodiment, first sleeve member 4, second sleeve member 7 and ring member 10 of bushing assembly 1 are preferably formed from a metal alloy such as steel, aluminum or titanium. Of course, depending upon the loading environments in which the bushing assembly is utilized, the individual elements of bushing assembly 1 can also be formed from other materials including plastic or composites. Furthermore, in order to enhance the ability of inner surface 23 of first sleeve member 4 and outer surface 40 of second sleeve member 7 to slide relative to each other in an axial direction, these surfaces may be coated with a low friction material such as grease, teflon or ion surface treatment. In assembling bushing assembly 1, second sleeve member 7 is first inserted within first sleeve member 4. Although not shown in the drawings, second sidewall 54 of ring member 10 initially defines an opening which permits annular shoulders 28 and 45 to be received therein and then is subsequently bent so as to engage annular shoulder 28 as discussed above. Depending upon the radial length of second sidewall 54, ring member 10 may also be split axially in a manner analogous to first and second sleeve members 4, 7 to facilitate the bending operation as will be further exemplified in discussing a second embodiment of the invention hereinafter.

Figure 3:
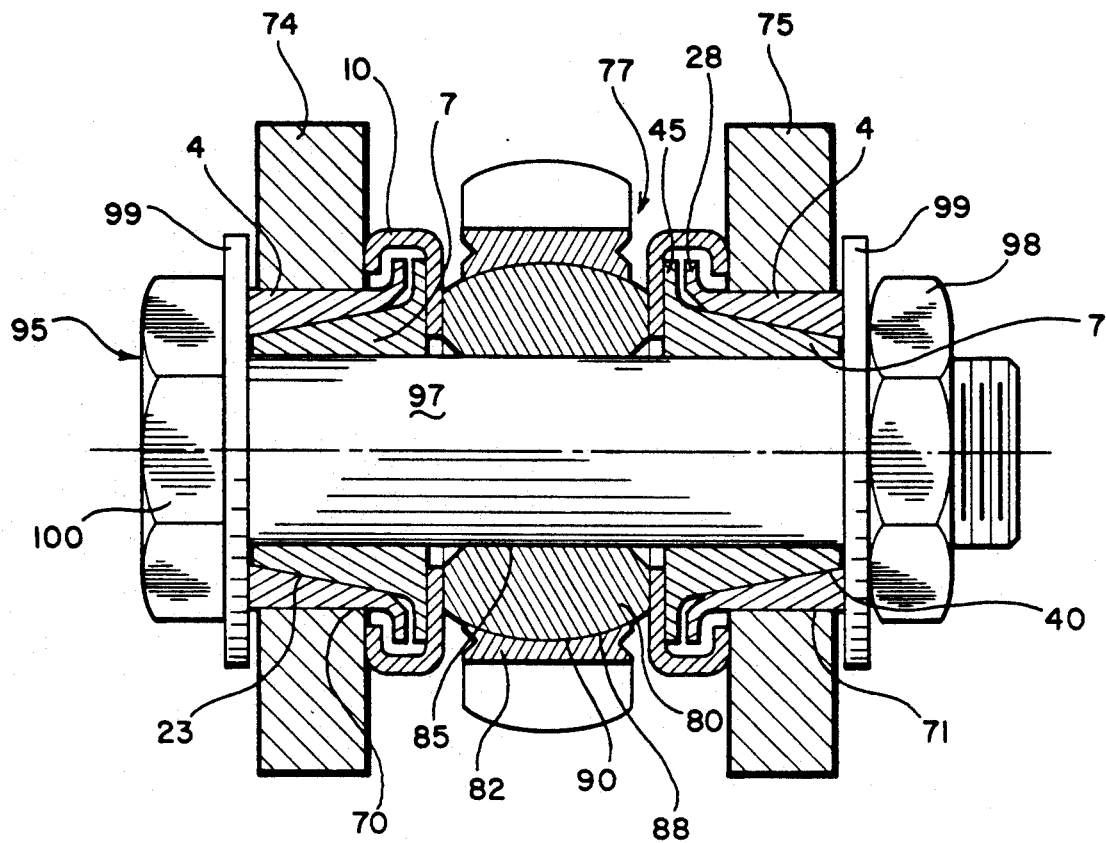
FIG. 3 depicts the bushing assembly of FIG. 1 embodied in a connecting joint.

Reference will now be made to FIG. 3 which depicts an actuator lever bearing and support assembly incorporating a pair of bushing assemblies according to the first embodiment of the invention. As shown, separate bushing assemblies are mounted within axially spaced and aligned bores 70, 71 formed within a pair of spaced, fixed support members 74, 75. Located between the bushing assemblies is a bearing 77 having an inner race 80 and an outer race 82. Inner race 80 is formed with a central, cylindrical throughhole 85 and includes a convexly shaped outer surface portion 88. Outer race 82 includes an inner concave surface portion 90 which geometrically conforms to the convex outer surface portion 88 of inner race 80. As is known in the art, the surface contact between inner race 80 and outer race 82 has a low friction coefficient such that when an actuator lever or other movable element is attached to outer race 82, the lever will be free to rotate and pivot freely about inner race 80.

In FIG. 3, a bolt 95 having a cylindrically shaped shaft portion 97 is adapted to extend through the second sleeve members 7 of the axially spaced bushing assemblies and throughhole 85 of inner race 80 and is tightened by means of a nut 98. Washers 99 may also be interposed between head 100 of bolt 95 and first sleeve member 4 of one bushing assembly and between nut 98 and a first sleeve member 4 of the second bushing assembly. By this arrangement, it should be recognized that the bushing assembly 1 of the present invention facilitates assembly since the various members comprising the bushing assembly are attached to one another through the use of ring member 10. This alleviates the need to separately assemble the individual bushing members or to separately align them.

In FIG. 3, the bushing assemblies are shown in their loaded state since nut 98 has been tightened onto bolt 95. In this condition, the axial distance between annular shoulders 28 and 45 has been reduced to the point that shoulders 28 and 45 are nearly engaged. This distance reduction occurs since, as nut 98 is tightened to bolt 95, inner surface 23 of first sleeve member 4 slides relative to outer surface 40 of second sleeve member 7. At the same time, due to the conical shape of inner surface 23 and outer surface 40, first and second sleeve members 4, 7 are radially expanded so as to be engaged against shaft portion 97 of bolt 95 and bores 70, 71 of fixed support members 74, 75. Therefore, with axial loading of bushing assemblies 1, inner race 80 is axially fixed between the respective ring members 10 and shaft portion 97 of bolt 95 is radially fixed within bores 70, 71 of fixed support members 74, 75. In fact, since first and second sleeve members 4, 7 are split, the axial loading which creates the radial load develops a hoop stress between shaft portion 97 and fixed support members 74, 75 which further prevents axial and radial movement and increases the fatigue life of the assembly. Annular shoulders 28 and 45 serve as built-in stops to prevent excessive hoop stress due to overtightening of bolt 95 since engagement of shoulders 28 and 45 prevent further build-up of hoop stress.

Figure 4:
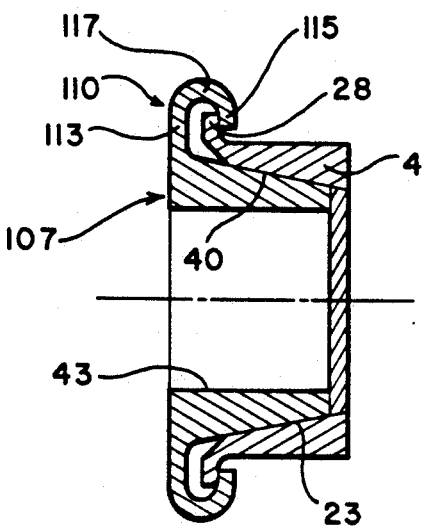
FIG. 4 depicts a cross-sectional view of a bushing assembly according to a second embodiment of the invention.
Figure 5:
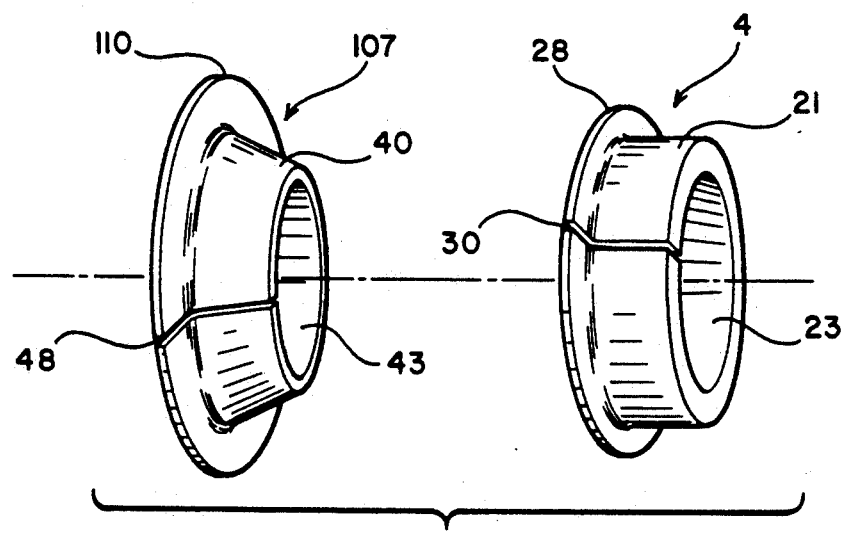
FIG. 5 depicts an exploded view of the components of the bushing assembly according to the second embodiment of the invention.
Figure 6:
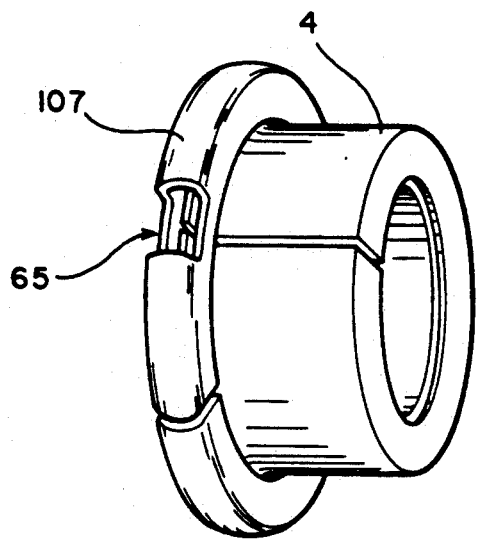
FIG. 6 is a perspective view of the bushing assembly according to the second embodiment in its assembled form.

Reference will now be made to FIGS. 4–6 and describing a bushing assembly according to a second embodiment of the invention wherein like reference numerals to the first embodiment have been utilized. In general, the bushing assembly according to the second embodiment differs from that of the first embodiment only with respect to the structure of the second sleeve member which obviates the need for a separate ring member as will be more fully described below. As shown in FIGS. 4 and 5, the first sleeve member in the bushing assembly of the second embodiment is identical to first sleeve member 4 of the first embodiment and therefore its structure will not be reiterated here. The bushing assembly according to the second embodiment includes a second sleeve member 107 which is analogous to second sleeve member 7 of the first embodiment in that it has an outer surface portion 40 which is conically shaped and geometrically conforms to the inner surface of first sleeve member 4 and an inner surface 43 which defines a cylindrically shaped, axially extending bore. In general, second sleeve member 107 of the second embodiment differs from second sleeve member 7 of the first embodiment only with respect to the length of its annular shoulder. In the second embodiment, second sleeve member 107 includes an elongated annular shoulder 110 which performs the function of ring member 10 in the first embodiment in that annular shoulder 110 is substantially U-shaped in cross section when assembled to first sleeve member 4 (as shown in FIGS. 4 and 6), thereby defining a first sidewall 113, a second sidewall 115 and a bridging wall 117. First and second sidewalls 113 and 115 are arranged generally parallel with respect to each other and bridging wall 117 extends about annular shoulder 28 of first sleeve member 4 in a radially spaced manner directly analogous to the way ring member 10 extends about annular shoulder 28 of first sleeve member 4 in the first embodiment described above. Furthermore, second sidewall 115 of elongated annular shoulder 110 extends radially inward so as to engage a radially extending portion of annular shoulder 28 to attach first sleeve member 4 to second sleeve member 107.

Therefore, from the above description, it can readily be seen that second sleeve member 107 in the second embodiment of the invention performs a function analogous to ring member 10 in that it attaches the individual members comprising the bushing assembly together such that they may be mounted as a single unit. As shown in FIG. 5, annular shoulder 110 of second sleeve member 107 initially extends radially outward and is subsequently bent about annular shoulder 28 of first sleeve member 4 when assembled. The bushing assembly according to the second embodiment is shown in its assembled state in FIG. 6. Since second sleeve member 107 is split at 48 in a manner directly analogous to second sleeve member 7 of the first embodiment, the hoop stress developed when the bushing assembly is axially contracted, as discussed above, will also be created with the second embodiment.

Figure 7:
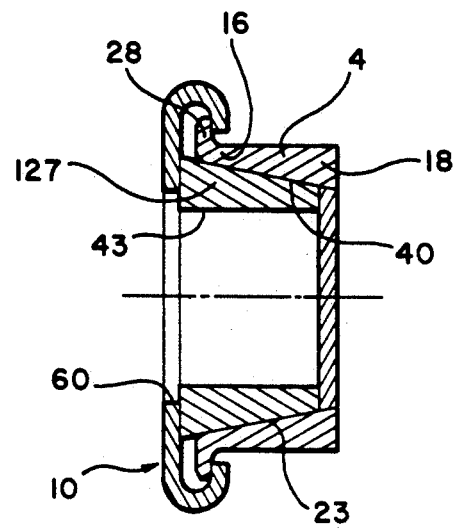
FIG. 7 depicts a cross-sectional plane view of a bushing assembly according to a third embodiment of the invention.
Figure 8:
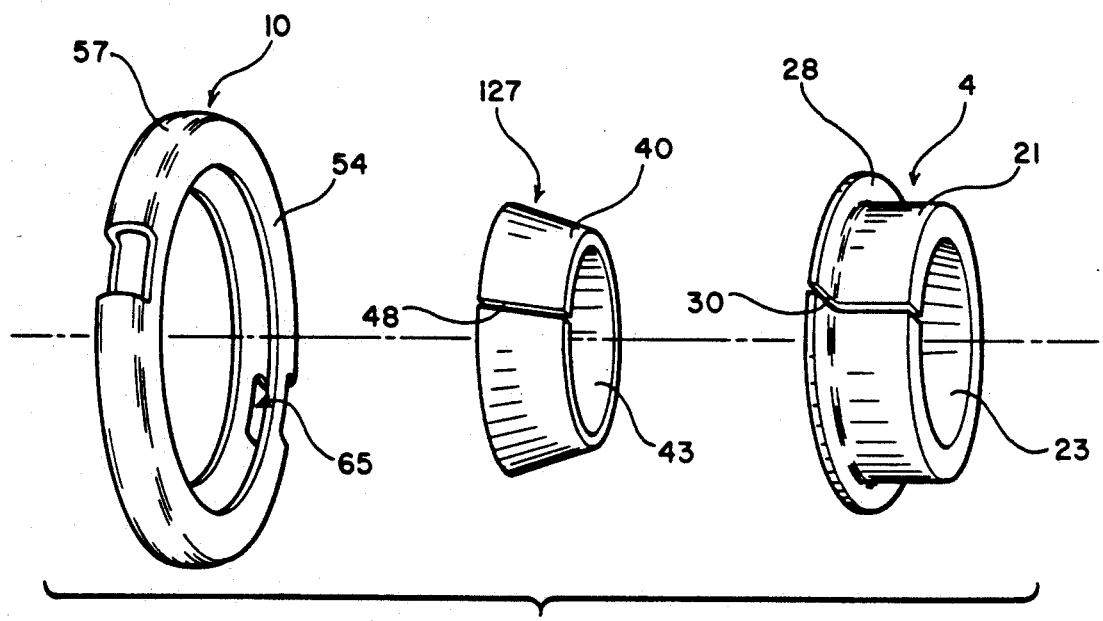
FIG. 8 shows a perspective, exploded view of the bushing assembly shown in FIG. 7.

Reference will now be made to a third embodiment of the invention shown in FIGS. 7 and 8. In general, this third embodiment is directly, structurally analogous to the first embodiment described above and therefore the same reference numerals have been carried over. The only difference between the first embodiment described and this third embodiment is that the second sleeve member 127 of the third embodiment does not incorporate an annular shoulder analogous to annular shoulder 28 of second sleeve member 7. Instead, second sleeve member 127 simply constitutes a conical split ring or sleeve which is interposed between ring member 10 and first sleeve member 4. In all other respects, the bushing assembly of the third embodiment functions in a manner directly analogous to that described above with reference to both the first and second embodiments in that it can be assembled as a unit and functions to eliminate axial and radial play in a connection joint. At this point, it should also be noted that second sleeve member 127 may be affixed to ring member 10 such that ring member 10 acts in unison with second sleeve member 127 in a manner analogous to the bushing arrangement described with reference to FIGS. 4–6.

Figure 9:
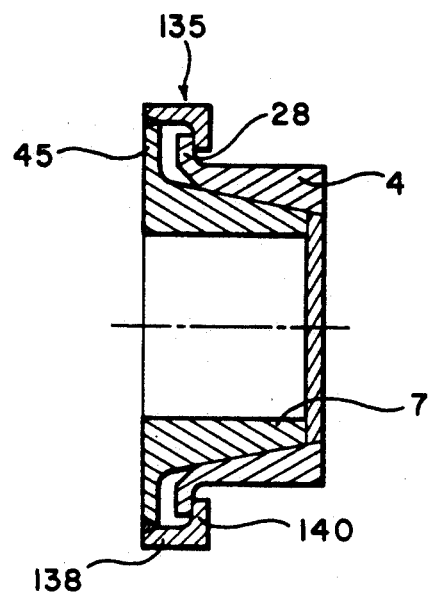
FIG. 9 depicts a cross-sectional plane view of a bushing assembly according to a fourth embodiment of the invention.
Figure 10:
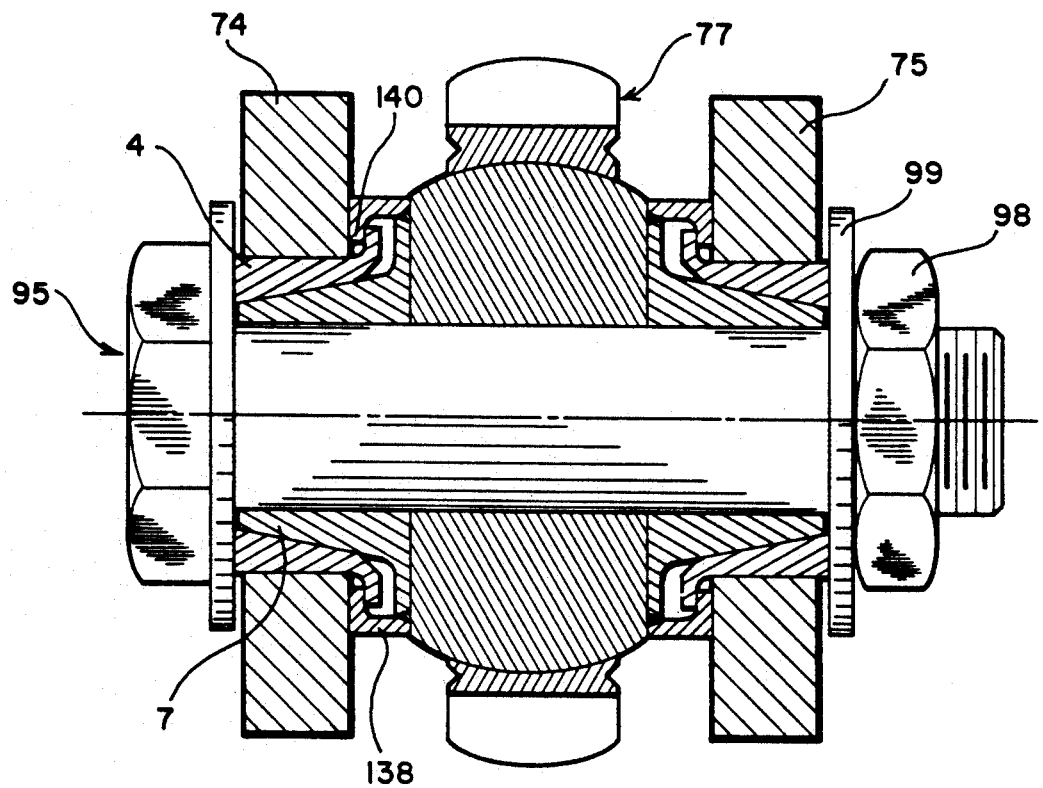
FIG. 10 depicts the bushing assembly of FIG. 9 embodied in a connecting joint.

Reference will now be made to FIGS. 9 and 10 in describing a fourth embodiment of the invention. Since this fourth embodiment is generally analogous to the embodiment shown in FIGS. 1–3, like reference numerals to the structure shown and described with reference to the FIGS. 1–3 embodiment have been carried over to FIGS. 9 and 10 and, therefore, a description of these elements will not be repeated here. The embodiment of FIGS. 9 and 10 differ from the FIGS. 1–3 embodiment in that an annular ring member 135 is brazed or welded to the end of annular shoulder 45 of second sleeve member 7. Annular ring member 135 is separately machined or forged with a substantial L-shaped cross-section so as to define an axial portion 138 and a radial portion 140. Axial portion 138 of annular ring member 135 is affixed to second sleeve member 7 with radial portion 140 extending about annular flange 28 of first sleeve member 7. FIG. 10 is generally analogous to FIG. 3 but depicts the bushing assembly according to the fourth embodiment in a connecting joint. This embodiment can be advantageously used in applications where high axial loads must be reacted by the busing assembly, such as in airplane landing gear components. Annular ring 135 functions as a cylindrical column that is well suited to react high axial loads should the bushing slip.

Although described with respect to particular embodiments of the invention, it is to be understood that various changes and/or modifications can be made without departing from the spirit of the invention. In general, the invention is intended only to be limited by the scope of the following claims.

I claim:

1. A bushing assembly for use in a joint connection comprising:
   a first sleeve member having first and second ends, said first sleeve member having a geometrically uniform outer contour and an inner contour that tapers from said second end toward said first end, said first end including an outwardly projecting shoulder area;
   a second sleeve member having first and second ends and an outer contour that tapers from said first end toward said second end, the outer contour of said second sleeve member having a geometry that conforms to the inner contour of said first sleeve member such that said second sleeve member can concentrically fit within said first sleeve member; and
   a ring member extending from the first end of said second sleeve member and engaging said shoulder area for maintaining said second sleeve member within said first sleeve member after said first and second members are concentrically assembled.

2. A bushing assembly as claimed in claim 1, wherein said first sleeve member has a cylindrically shaped outer contour and a conically shaped inner contour; and said second sleeve member has a conically shaped outer contour and a cylindrically shaped inner contour.

3. A bushing assembly as claimed in claim 1, wherein said ring member is substantially U-shaped in cross-section with a pair of sidewalls interconnected by a bridging wall.

4. A bushing assembly as claimed in claim 3, wherein said ring member includes at least one opening in said bridging wall.

5. A bushing assembly as claimed in claim 4, wherein said opening extends into said sidewalls.

6. A bushing assembly as claimed in claim 1, wherein said first and second sleeve members are longitudinally split.

7. A bushing assembly as claimed in claim 1, further including an outwardly projecting shoulder area carried by the first end of said second sleeve member.

8. A bushing assembly as claimed in claim 7, wherein said ring member engages the shoulder areas of said first and second sleeve members.

9. A bushing assembly as claimed in claim 8, wherein said first sleeve member has a cylindrically shaped outer contour and a conically shaped inner contour; and said second sleeve member has a conically shaped outer contour and a cylindrically shaped inner contour.

10. A bushing assembly as claimed in claim 1, wherein said ring member comprises a shoulder carried by the first end of said second sleeve member.

11. A bushing assembly as claimed in claim 10, wherein said first sleeve member has a cylindrically shaped outer contour and a conically shaped inner contour; and said second sleeve member has a conically shaped outer contour and a cylindrically shaped inner contour.

12. A bushing assembly as claimed in claim 1, wherein said ring member is fixedly secured to the first end of said second sleeve member.

13. A bushing assembly as claimed in claim 12, wherein said ring member is brazed or welded to the first end of said second sleeve member.

* * * * *